(12) United States Patent
Barlag et al.

(10) Patent No.: US 10,894,344 B2
(45) Date of Patent: Jan. 19, 2021

(54) FORMING TOOL AND METHOD FOR FORMING A SEMI-FINISHED PRODUCT COMPRISING REINFORCEMENT FIBERS AND FORMING APPARATUS

(71) Applicant: Airbus Operations GmbH, Hamburg (DE)

(72) Inventors: Carsten Barlag, Hamburg (DE); Sascha Backhaus, Hamburg (DE); Florian Miske, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 382 days.

(21) Appl. No.: 14/993,516

(22) Filed: Jan. 12, 2016

(65) Prior Publication Data

US 2016/0200015 A1    Jul. 14, 2016

(30) Foreign Application Priority Data

Jan. 12, 2015 (EP) .................................... 15150787

(51) Int. Cl.
*B29C 43/34* (2006.01)
*B29C 43/18* (2006.01)
(Continued)

(52) U.S. Cl.
CPC .............. *B29C 43/34* (2013.01); *B29C 43/18* (2013.01); *B29C 43/3642* (2013.01);
(Continued)

(58) Field of Classification Search
CPC ..... B29C 43/34; B29C 43/18; B29C 43/3642; B29C 43/56; B29C 43/58
See application file for complete search history.

(56) References Cited

U.S. PATENT DOCUMENTS

| 4,877,469 A | * | 10/1989 | Szyms | ................. B29C 43/104 |
| | | | | 156/123 |
| 5,648,109 A | | 7/1997 | Gutowski et al. | |

(Continued)

FOREIGN PATENT DOCUMENTS

| CN | 100418850 | 1/2007 |
| CN | 101910493 | 12/2010 |

(Continued)

OTHER PUBLICATIONS

Chinese Office Action, dated Aug. 18, 2017.
European Search Report, dated Jun. 15, 2015.

*Primary Examiner* — Michael M. Robinson
(74) *Attorney, Agent, or Firm* — Greer, Burns & Crain, Ltd.

(57) ABSTRACT

A forming tool for forming a semi-finished product comprising reinforcement fibers and being conveyed to the forming tool in a continuous process. The forming tool comprises at least one pressure bag configured to be pressurized during a forming step of the semi-finished product, during which the semi-finished product is sandwiched between a forming surface of a forming element and the at least one pressurized pressure bag, such that the semi-finished product substantially takes on the shape of the forming surface. Further, a forming apparatus and a forming method for forming a semi-finished product comprising reinforcement fibers are provided.

8 Claims, 3 Drawing Sheets

(51) Int. Cl.
  *B29C 43/36* (2006.01)
  *B29C 43/56* (2006.01)
  *B29C 43/58* (2006.01)
  *B29C 33/30* (2006.01)
  *B29L 31/00* (2006.01)
  *B29C 33/40* (2006.01)
  *B29C 33/34* (2006.01)
  *B29K 105/12* (2006.01)
  *B29K 105/00* (2006.01)
  *B29K 307/04* (2006.01)
  *B29K 309/08* (2006.01)

(52) U.S. Cl.
  CPC .............. *B29C 43/56* (2013.01); *B29C 43/58* (2013.01); *B29C 33/308* (2013.01); *B29C 33/34* (2013.01); *B29C 33/405* (2013.01); *B29C 2043/3416* (2013.01); *B29C 2043/3644* (2013.01); *B29C 2043/3649* (2013.01); *B29C 2043/562* (2013.01); *B29C 2043/5808* (2013.01); *B29K 2105/12* (2013.01); *B29K 2105/256* (2013.01); *B29K 2307/04* (2013.01); *B29K 2309/08* (2013.01); *B29L 2031/001* (2013.01)

(56) References Cited

U.S. PATENT DOCUMENTS

| | | |
|---|---|---|
| 6,231,796 B1 | 5/2001 | Allen |
| 8,226,787 B2 | 7/2012 | Benson et al. |
| 2006/0017200 A1* | 1/2006 | Cundiff .................. B29C 70/44 |
| | | 264/511 |
| 2007/0023572 A1 | 2/2007 | Muller et al. |
| 2007/0175571 A1 | 8/2007 | Rubin et al. |
| 2010/0170631 A1 | 7/2010 | Kim et al. |
| 2010/0285265 A1 | 11/2010 | Shinoda et al. |
| 2014/0103585 A1 | 4/2014 | Coxon et al. |

FOREIGN PATENT DOCUMENTS

| | | |
|---|---|---|
| DE | 102004001078 | 7/2005 |
| DE | 102007062111 | 7/2009 |
| EP | 2206598 | 7/2010 |
| EP | 2479021 | 7/2012 |
| EP | 2623302 | 8/2013 |

* cited by examiner

FORMING TOOL AND METHOD FOR FORMING A SEMI-FINISHED PRODUCT COMPRISING REINFORCEMENT FIBERS AND FORMING APPARATUS

CROSS-REFERENCES TO RELATED APPLICATIONS

This application claims the benefit of the European patent application No. 15150787.80 filed on Jan. 12, 2015, the entire disclosures of which are incorporated herein by way of reference.

BACKGROUND OF THE INVENTION

The present invention relates to a forming tool and a method for forming a semi-finished product comprising reinforcement fibers. The present invention further relates to a forming apparatus for forming a semi-finished product comprising reinforcement fibers.

In aircraft construction, efforts are being made increasingly to use, as load-bearing components, components that are made entirely or partially of fiber reinforced composite materials, for example carbon fiber reinforced plastics (CFRP). For example DE 10 2007 062 111 A1 describes a crosspiece structure made of carbon fiber reinforced plastics material that is used to support the individual panels of an aircraft floor system for separating a passenger cabin from a cargo area disposed underneath the passenger cabin. It is further known for example from DE 10 2004 001 078 A1 and/or CN 100418850 to provide aircraft fuselage segments with a skin and reinforcing elements (for example frames, stringers) made of fiber reinforced composite materials.

When manufacturing aircraft structural components from fiber reinforced composite materials, first a multi-layer laminate is constructed from fiber prepregs. The fiber prepregs may comprise a woven or non-woven fabric made of reinforcing fibers, which is provided with a surface layer of a curable synthetic material, for example an epoxy resin material. The laminate construction may be effected manually or in an automated manner The fiber prepregs may then be brought into a desired shape of a planar portion forming an aircraft skin or of a reinforcing portion forming a frame or stringer. Finally the curable material applied onto the surfaces of the fibers is cured under pressure and/or raised temperature in an autoclave cycle, thereby producing a composite material having a matrix of a cured synthetic material and reinforcing fibers embedded in the matrix. An autoclave process lends itself particularly well to the individual manufacture of components even of a complex shape.

For the forming process of the uncured prepreg material (for example, in a U-shaped profile), several techniques are known. For example, a common method for forming U-shaped profiles from stacked prepregs is diaphragm forming, frequently also called hot drape forming A flat multi-ply stack is positioned on a mandrel (a forming element). Subsequently, the mandrel is fixed on a vacuum table and an elastomeric membrane (typically silicon rubber) is placed thereon. As prepreg forming requires elevated temperatures heat is applied. Therefore, infrared heating devices are commonly installed above the membrane. Upon reaching the forming temperature a vacuum pressure is created between the mandrel and the membrane. Due to the presence of atmospheric pressure, the membrane stretches, consequently shaping and pre-consolidating the prepreg sheet into the desired geometry.

However, this method requires simultaneous forming of the entire profile length. Consequently, shaping long structural members, e.g., found in flap covers of aircraft, results in large floor-space footprints of associated forming plants.

SUMMARY OF THE INVENTION

The invention is directed to an object of providing a forming tool and a method for forming a semi-finished product comprising reinforcement fibers, which reduce the floor-space footprint of an associated forming plant and which simplify the forming process and improve the quality of large formed structures. The invention is further directed to an object of providing a forming apparatus for forming a semi-finished product comprising reinforcement fibers.

According to a first aspect, a forming tool for forming a semi-finished product comprising reinforcement fibers and being conveyed to the forming tool in a continuous process comprises at least one pressure bag configured to be pressurized during a forming step of the semi-finished product, during which the semi-finished product is sandwiched between a forming surface of a forming element and the at least one pressurized pressure bag, such that the semi-finished product substantially takes on the shape of the forming surface.

The semi-finished product comprising reinforcement fibers may be a so-called prepreg material comprising a plurality of layers each comprising pre-impregnated fibers. The fibers may be pre-impregnated such that a matrix material (e.g., an epoxy) is already present. The matrix material is not fully cured, such that the semi-finished product is formable, e.g., under the influence of heat applied before or during the forming step. The fibers may comprise, e.g., glass, carbon, basalt, or aramid fibers. The pressure bag may be, e.g., an elastomer bag comprising an elastomer membrane. The pressure bag may comprise at least one local reinforcement, e.g., in the form of a thicker membrane portion or additional material (e.g., woven cloth) applied on at least one local portion of the membrane of the pressure bag. The pressure bag may be inflatable by air or by a gas, such that the side walls of the pressure bag are substantially impermeable to air or the gas. The pressure bag may also be fillable by a liquid. The pressure bag may be formed such that in an inflated (or pressurized) state thereof, part of its membrane substantially correspond to a desired forming surface of a forming element used during the forming step. During the forming step, the pressurized pressure bag presses the semi-finished product onto the shaping surface of the forming element, such that the semi-finished product substantially takes on the shape of the forming surface. The forming surface of the forming element may be substantially U-shaped and the forming surface may be a convex surface. Further, the forming element may have any desired shape, e.g., the forming element may comprise convex parts, concave parts, joggles, ramps, curvatures, and/or variations of its cross section.

The forming tool may comprise a plurality of pressure bags configured to be pressurized during the forming step. The plurality of pressure bags may each comprise at least one volume, which may be pressurized independently from the volumes of the other pressure bags of the plurality of pressure bags. In other words, the plurality of pressure bags may be individually pressurized. The plurality of pressure bags may comprise a plurality of individual bags each having their own membrane. The plurality of pressure bags may also be integrally formed such that, e.g., one pressure bag with a plurality of volumes is used, wherein each one of the volumes may be individually pressurized. At least one of the plurality of pressure bags may share part of a membrane thereof with an adjacent one of the plurality of pressure bags. The plurality of pressure bags may comprise volumes which are connected to each other, such that the connected volumes may be pressurized and de-pressurized together via the same inlet and/or outlet. The plurality of pressure bags may be made of the same material or made of different materials. Further, the plurality of pressure bags may comprise local reinforcements.

The forming tool may comprise at least one pressure distribution element different from a pressure bag. The pressure distribution element may be, e.g., an elastomer block. The pressure distribution element may be configured to apply pressure to a section of the semi-finished product, to which no pressure is applied by the at least one pressure bag. Thus, at least one of the pressure bag (sections) may be assisted or replaced by the pressure distribution element different from a pressure bag, e.g., an elastomer block.

The forming tool may comprise a controller configured to control an amount of pressure, a pressurizing start time, and/or a pressurizing end time of the at least one pressure bag. The controller may be, e.g., a controller of a forming apparatus comprising the forming tool. The controller may use a software to control an amount of pressure, a pressurizing start time, and/or a pressurizing end time. The controller may be operated by a user, e.g., by means of a computer and/or a user interface. The pressurizing start time may be, e.g., a time of beginning to pressurize the at least one pressure bag or a time when the pressure in the pressure bag has reached a predetermined first value. The pressurizing end time may be, e.g., a time of beginning to de-pressurize the pressure bag or a time when the pressure in the pressure bag has reached a predetermined second value smaller than the first value. In the case that a plurality of pressure bags is provided, the controller may be configured to individually control an amount of pressure, a pressurizing start time, and/or a pressurizing end time of each one of the plurality of pressure bags. The controller may be configured to control a predefined order of pressurizing start times of the individual pressure bags. For example, the controller may be configured to control the pressurizing start times of the plurality of pressure bags such that first one pressure bag is pressurized and then, consecutively, the other pressure bags are pressurized. Alternatively or additionally, the controller may be configured to control an amount of pressure in each one of the plurality of pressure bags, such that the pressure in at least two of the pressure bags is different from each other.

The forming tool may comprise a fluid inlet for supplying the at least one pressure bag with a pressurized fluid, a fluid outlet for allowing the fluid to flow out of the at least one pressure bag, and a valve unit for controlling a fluid flow through the fluid inlet and the fluid outlet. The term fluid is used herein as a generic term for gases and liquids. Thus, the pressure bag may be pressurized by using a pressurized gas (e.g., air) and/or by using a pressurized liquid (e.g., water). The fluid inlet and the fluid outlet may be provided by one and the same opening in a side wall of the at least one pressure bag. Further, an individual opening for the fluid inlet and an individual opening for the fluid outlet may be provided in a side wall of the at least one pressure bag. The valve unit may be configured to individually control an opened/closed state of the fluid inlet and the fluid outlet. The valve unit may be controlled by a controller, e.g., by a controller of the forming tool. In the case a plurality of pressure bags are used, a fluid inlet and a fluid outlet may be provided for each one of the plurality of pressure bags. Further, at least two of the plurality of pressure bags may share the same fluid inlet and/or the same fluid outlet. When the fluid outlet is in an open state, the pressurized fluid may either flow out of the pressure bag due to its own overpressure or may be actively sucked out of the fluid outlet, e.g., by means of a pump and/or a vacuum.

According to a second aspect, a forming apparatus for forming a semi-finished product comprising reinforcement fibers comprises a forming tool as described herein, a forming element, and a conveying device for conveying the semi-finished product along a conveying direction. The forming surface of the forming element may be substantially U-shaped and the forming surface may be a convex surface. Further, the forming element may have any desired shape, e.g., the forming element may comprise flat parts, convex parts, concave parts, joggles, ramps, curvatures, and/or variations of its cross section. The forming element may be formed, e.g., of aluminum, steel, invar, carbon-fiber-reinforced plastic (CFRP) or glass-fiber reinforced plastic (GRP). Further, the forming element may comprise at least one sticking prevention layer at the forming surface thereof, for preventing sticking of the semi-finished product to the forming element after the forming step. The conveying device may convey the semi-finished product together with the forming element along the conveying direction. The semi-finished product may stay in contact with the forming apparatus at the forming surface, while the semi-finished product is conveyed together with the forming apparatus along the conveying direction. In this case, a cross section of the forming element taken in a plane perpendicular to the conveying direction may vary along the conveying direction. Further, the conveying device may convey the semi-finished product relatively to the forming element, e.g., such that only the semi-finished product is moved in the conveying direction while the forming element does not change its location along the conveying direction. The conveying device may comprise, e.g., a clamping apparatus, a conveyor belt, a roll, and/or other devices suitable for conveying the semi-finished product along the conveying direction.

The conveying device may comprise at least two clamping apparatuses arranged consecutively in the conveying direction and configured to convey the semi-finished product or the forming element along the conveying direction. Each one of the clamping apparatuses may be brought into a closed state and an opened state. In the closed state, each of the clamping apparatuses may grab a part of the semi-finished product (e.g., if only the semi-finished product is conveyed) and/or the forming element (e.g., if the semi-finished product is conveyed together with the forming element). At least one of the clamping apparatuses is configured to move in the conveying direction in a closed state thereof. The clamping apparatuses may be configured to be moved and closed alternatingly.

The forming apparatus may further comprise a preforming tool arranged in front of the forming tool in the conveying direction, wherein the preforming tool is configured to preform the semi-finished product. The preforming tool may be configured to preform the semi-finished product such that the preformed semi-finished product has a form between an initial form of the semi-finished product (e.g., a flat sheet) and a desired final form (substantially the form of the forming surface). In other words, the preforming tool may preform the semi-finished product, such that it almost has the form of the forming surface of the forming element. For example, a degree of deformation applied by the preforming tool may be at least 0.9. The preforming tool may comprise rolls and/or guide plates for preforming the semi-finished product by applying a force to the semi-finished product. The preforming tool may be configured to self-adjust to variable cross-sectional shapes of the forming element and/or different forming elements. For example, if the cross section of a forming element taken in a plane perpendicular to the conveying direction varies along the conveying direction, the preforming tool may self-adjust (e.g., by moving rolls and/or guide plates) to the varying cross-sectional shape of the forming element.

A cross section of the forming element taken in a plane perpendicular to the conveying direction of the semi-finished product may vary along the conveying direction. By using a forming element having such a varying cross section, a semi-finished product may be produced having a varying cross section taken in a plane perpendicular to the conveying direction. For example, a plurality of forming steps may be applied for forming one semi-finished product. Thus, a long semi-finished product may be obtained having a varying cross section along an extension direction of the semi-finished product.

According to a third aspect, a method for forming a semi-finished product comprising reinforcement fibers comprises conveying the semi-finished product to a forming tool comprising at least one pressure bag and pressurizing the at least one pressure bag, while the semi-finished product is sandwiched between a forming surface of a forming element and the pressurized forming bag, such that the semi-finished product substantially takes on the shape of the forming surface.

The forming tool may comprise a plurality of pressure bags and the method may comprise pressurizing the plurality of pressure bags and/or individually controlling a pressurizing start time of each one of the plurality of pressure bags.

The method may further comprise pressurizing a first pressure bag adjacent to a middle portion of the semi-finished product as seen in a cross section taken in a plane perpendicular to a conveying direction of the semi-finished product and after pressurizing the first pressure bag, pressurizing a second pressure bag closer to a side portion of the semi-finished product as seen in the cross section taken in the plane perpendicular to the conveying direction of the semi-finished product. The method may comprise consecutively pressurizing the plurality of pressure bags starting from a middle portion of the semi-finished product to one or both side portions of the semi-finished product as seen in the cross section taken in the plane perpendicular to the conveying direction.

The step of pressurizing the at least one pressure bag may comprise allowing a pressurized gas to flow into the pressure bag, and the method may further comprise after the step of pressurizing, allowing the gas to flow out of the at least one pressure bag by means of a vacuum. By allowing the gas to flow out of the at least one pressure bag by means of a vacuum, the gas is sucked out of the at least one pressure bag by the vacuum applied to an outlet of the pressure bag (e.g., by means of a vacuum pump).

The semi-finished product may be conveyed in a continuous process in a conveying direction and/or the semi-finished product may be conveyed in a continuous process in a conveying direction, wherein in a first forming step a first section of a final product form comprising the semi-finished product is formed and in a subsequent second forming step a second section of the final product form comprising the semi-finished product is formed. The continuous process may be a process in which forming steps sequentially follow one another. The continuous process may be a process in which in a first forming step a first part of a semi-finished product (a first section of a final product form) is formed and in a second forming step a second part of the semi-finished product (a second section of the final product form) is formed. The continuous process may also be a process in which in a first forming step a first semi-finished product (an entire first final product form) is formed and in a second forming step a second semi-finished product (an entire second final product form) different from the first semi-finished product is formed. The semi-finished product may be conveyed in the conveying direction together with the forming element, e.g., such that the forming element and the semi-finished product stay in contact with each other. Further, the semi-finished product may be conveyed relatively to the forming element, such that the semi-finished product is moved with respect to the forming element (which might maintain its location with respect to the conveying direction).

The method may further comprise before the step of pressurizing, preforming the semi-finished product by means of a preforming tool.

BRIEF DESCRIPTION OF THE DRAWINGS

Preferred embodiments of the invention now are described in greater detail with reference to the appended schematic drawings, wherein

FIG. 3b shows a schematic diagram showing a method of operating the conveying device shown in FIG. 3a.

DETAILED DESCRIPTION OF THE PREFERRED EMBODIMENTS

Figure 1A:
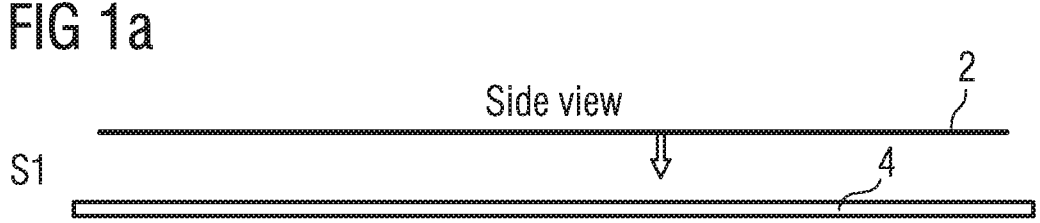
FIG. 1a shows a schematic side view of a first step of a method for forming a semi-finished product comprising reinforcement fibers.

FIG. 1 shows a schematic side view of a first step S1 of a method for forming a semi-finished product 2 comprising reinforcement fibers. The method may be carried out, e.g., by a forming tool described herein. The forming tool may be part of a forming apparatus described herein. The semi-finished product 2 is a prepreg material comprising pre-impregnated fibers, wherein the semi-finished product 2 may comprise a plurality of prepreg layers.

In the first step S1 (placing step), the semi-finished material 2 is placed and fixed on a forming element 4 (a mandrel) by means of a placing tool. A surface of the forming element 4 onto which the semi-finished material 2 is placed corresponds to a forming surface of the forming element, wherein the forming surface has a desired shape of the final shaped semi-finished product (net shape or final form). In the embodiment shown in FIG. 1a, the forming element 4 is shown as having a flat top surface as seen in a side view thereof corresponding to a forming surface. However, the forming surface of the forming element 4 may have any kind of desired form, e.g., a flat shape, a curved shape, a convex shape (e.g., substantially U-shaped), a concave shape, etc., depending on a desired final form of an end product.

After the first step S1, the semi-finished material 2 stays on the forming element 4 and is conveyed in a conveying direction C, such that at a second tool a second step S2 can be carried out. The conveying is carried out by means of a conveying device, an example of which will be described in detail below with reference to FIGS. 3a and 3b.

In step S2 (heating step), the semi-finished material 2 is heated by a heating tool. Examples of a heating tool include a tunnel-type convection oven or an infrared radiator. In step S2, the semi-finished material 2 is heated up to a temperature, at which a matrix material of the semi-finished product (e.g., an epoxy resin) has reached a viscosity which enables forming of the semi-finished material 2 by applying a force. During the method for forming the semi-finished material 2, the semi-finished material 2 maintains a temperature which enables forming, at least until the final forming step S4 described below. In case a matrix material is used, which is already formable at room temperature, the heating step S2 may be omitted. The semi-finished material 2 stays on the forming element 4 and is further conveyed to a third tool, where a third step S3 is carried out.

In step S3 (preforming step), the semi-finished material 2 is preformed by means of a preforming tool. The preforming tool forms the semi-finished product 2 to a near net shape geometry. In other words, the semi-finished product leaving the preforming tool has a form similar to the final form but between the initial form (e.g., planar) and the desired final form. For example, a degree of deformation applied by the preforming tool may be approximately 0.9 or at least 0.9. The preforming tool may comprise a preforming station, progressively corresponding to the desired final form of the semi-finished product 2. The preforming tool may comprise rolls and/or guide plates for preforming the semi-finished product 2. The semi-finished product 2 is preformed by applying a force to the semi-finished product 2 in a desired preforming direction. A possible embodiment of the pre-forming tool is configured to self-adjust to variable cross-sectional shapes of the forming element 4 and/or different forming elements 4. Thus, e.g., if a cross-sectional shape of the forming element 4 varies along the conveying direction C, the preforming tool may adapt to this variation, e.g., by moving rollers and/or guide plates in a direction of variation of the cross-sectional shape. Although the preforming step S3 is shown in the embodiment of FIG. 1b, it may be omitted, e.g., in the case that the semi-finished material 2 has a high flexibility and/or in the case that the desired final form is a relatively flat form, such that no substantial deformation is necessary in order to arrive at the final form. The semi-finished material 2 stays on the forming element 4 and is conveyed in the conveying direction C to a forming tool 6 where a fourth step S4 is carried out.

In step S4 (forming step), the semi-finished 2 product is formed into its final form by the forming tool 6. Further details of the forming step S4 will be described later with reference to FIGS. 2a and 2b. In step S4, the semi-finished product 2 is formed into the desired final form by means of at least one pressure bag. After the forming step S4, the semi-finished product 2 having the desired final form stays on the forming element 4 and is conveyed in the conveying direction C to a trimming tool, where a trimming step S5 is carried out.

In step S5 (trimming step), flanges of the semi-finished product 2 are trimmed by means of a trimming tool. A possible embodiment of the trimming tool comprises at least one NC-cutting device arranged perpendicular to a flange of the forming element 4. However, step S5 may also be omitted, e.g., if flanges already have the net shape or if they are trimmed in a later step. After step S5, the semi-finished product 2 stays on the forming element 4 and is conveyed in the conveying direction C.

The semi-finished product 2 may now be ready for a curing step by means of a curing tool. However, before curing, further material (e.g., a curable material like, e.g., epoxy resin) may be applied to the formed semi-finished product 2. The curing step may comprise an autoclave cycle. During the curing step, the semi-finished material 2 may stay on its forming element 4. However, due to different thermal expansion coefficients of the semi-finished product 2 and the forming element 4 (e.g., when a forming element 4 made of metal is used), the semi-finished product 2 may be transferred to a curing element. Preferably, the curing element has a thermal expansion coefficient similar to that of the semi-finished product 2. Desirable materials for a curing element may comprise invar, carbon-fiber-reinforced plastic (CFRP), or glass-fiber reinforced plastic (GRP).

Further, a cooling step may be carried out after or during the forming step S4. Since the semi-finished product 2 shall keep its final form into which it has been formed by the forming tool 6, it is desirable that a viscosity of the matrix material is reduced after the shaping step S4. This change of viscosity may be achieved either by a dwell step at the surrounding temperature (e.g., room temperature) or by actively cooling the semi-finished product 2 during a cooling step. During the cooling step, the semi-finished material 2 may be actively cooled, e.g., by means of a cooling gas (e.g., cooling air) or a cooling liquid (e.g., cooling water). Additionally or alternatively, the forming element 4 may be cooled.

Figure 1B:
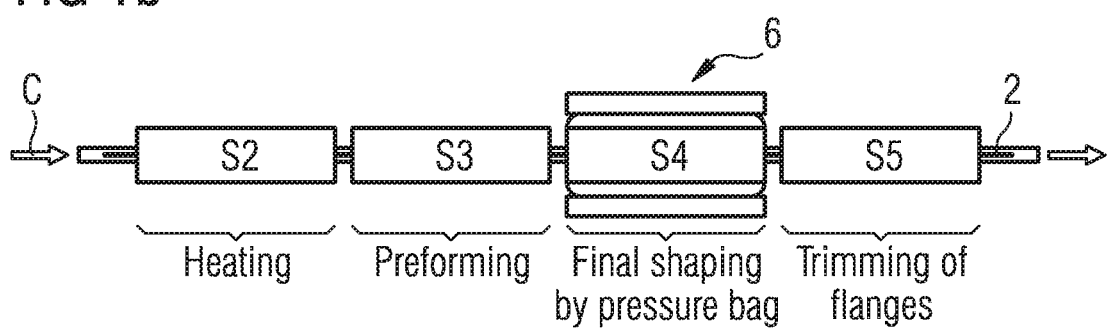
FIG. 1b shows a schematic side view of a second, third, fourth, and fifth step of the method for forming a semi-finished product comprising reinforcement fibers.

In the description of FIGS. 1a and 1b above, an embodiment is described, in which the semi-finished product 2 stays on the forming element 4 after it has been placed on the forming element 4 during the placing step S1 and it is conveyed together with the forming element 4 in the conveying direction C. Thus, a cross-sectional shape of the forming element 4 may vary along the conveying direction C. Further, a large product may be formed by conveying a large forming element 4 through the different tools and by successively carrying out steps S1-S5 at different sections of the forming element 4. For example, a product may be formed having a curvature along an extension direction thereof (corresponding to the conveying direction C) and/or having a varying cross-sectional shape along the extension direction and/or having local structures like protrusions and/or notches.

However, according to a different embodiment, a position along the conveying direction of the semi-finished product 2 with respect to the forming element 4 may change during the method of steps S1-S5. For example, the semi-finished product may be shifted along the forming element 4, e.g., in the case that a cross-sectional shape of the forming element 4 does not change along the conveying direction C.

Figure 1C:
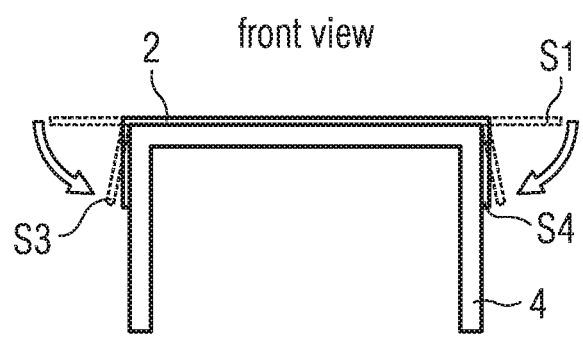
FIG. 1c shows a schematic cross-sectional front view of the semi-finished product after the first, third, and fourth steps of the method for forming a semi-finished product comprising reinforcement fibers.

FIG. 1c shows a schematic cross-sectional front view of the forming element 4 and the semi-finished product 2 after the steps S1, S3, and S4 of the method described above. As can be seen in FIG. 1c, after the placing step S1, the semi-finished product 2 has an initial form, which is, e.g., a substantially planar shape (which may deviate due to gravitational forces). After the preforming step S3, the semi-finished product 2 has a form between the initial form and the desired final form. The form after step S3 may be similar to the final form but not fully corresponding to the forming surface of the forming element 4.

The method described above may be carried out by a forming apparatus described herein. The forming apparatus comprises the tools necessary for carrying out the steps S1-S5 described above. Thus, the forming apparatus may comprise a placing tool, a heating tool, a preforming tool, a forming tool 6, and a trimming tool. The forming apparatus further comprises the forming element 4 and a conveying device for conveying the semi-finished product 2 along the conveying direction C. However, some of these steps and/or tools may be omitted and/or carried out by another device, such that the forming apparatus at least comprises the forming tool 6, the forming element 4, and the conveying device.

Figure 2A:
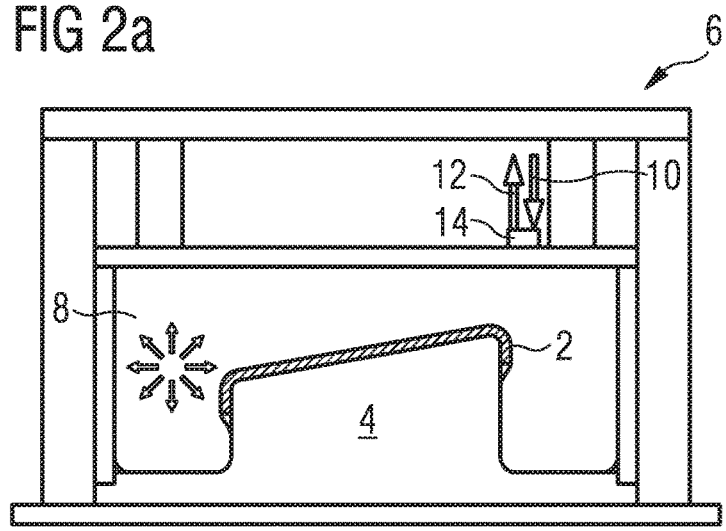
FIG. 2a shows a schematic front view of a forming tool for forming a semi-finished product comprising reinforcement fibers, as used, e.g., in the fourth step of the method shown in FIGS. 1a-c, the forming tool comprising one pressure bag.

FIG. 2a shows a schematic cross-sectional front view of an embodiment of a forming tool 6, which may be used, e.g., in step S4 of the method described above with reference to FIGS. 1a-c.

FIG. 2a shows the forming tool 6 during a forming step. During the forming step, a forming element 4 is positioned at the forming tool 6. On top of the forming element 4, a semi-finished product 2 comprising reinforcement fibers is positioned. Before the forming step, the semi-finished product 2 may have been preformed as described above with reference to step S3. The semi-finished product 2 has been conveyed into the forming tool 6 in a conveying direction C perpendicular to the drawing plane of FIG. 2a. The forming tool 6 comprises a pressure bag 8 configured to be pressurized during the forming step. Once the semi-finished product 2 has reached a desired forming position, the pressure bag 8 is pressurized (e.g., inflated by pressurized air or a pressurized liquid). Due to the pressure of the pressure bag 8, forces are applied from a membrane of the pressure bag 8 to the semi-finished product 2 in directions away from an inside of the pressure bag 8 towards the forming element 4. Due to these forces, the semi-finished product 2 is formed and finally obtains a form substantially corresponding to a form of a forming surface of the forming element 4. The forming surface corresponds to a surface of the forming element 4, which is in contact with the semi-finished product 2 at the end of the forming step. As shown in FIG. 2a, the semi-finished product 2 is sandwiched between the forming surface of the forming element 4 and the pressure bag 8.

The forming tool 6 comprises a fluid inlet 10 for supplying the pressure bag 8 with a pressurized fluid, a fluid outlet 12 for allowing the fluid to flow out of the pressure bag 8, and a valve unit 14 for controlling a fluid flow through the fluid inlet 10 and the fluid outlet 12. The pressurized fluid is, e.g., a gas or a liquid. The pressurized fluid may be pressurized by means of a pump. At a pressurizing start time, pressurized fluid starts to flow into the pressure bag 8. The pressurizing start time may be defined by a time when the valve unit 14 for the fluid inlet 10 is opened and/or by a time when a pump starts to pressurize the fluid. During a pressurizing dwell period, the pressurized pressure bag 8 maintains its pressure to the semi-finished product 2. FIG. 2a shows the forming tool 6 during the pressurizing dwell period, wherein the pressure in the pressure bag 8 is symbolically indicated by arrows. The pressurizing dwell period may be used as cooling step in order to cool down the semi-finished product 2, as explained above. Additionally, the pressurized fluid (e.g., water or air) may be cooled before it is supplied into the pressure bag 8. During the pressurizing dwell period, the valve unit 14 for both the fluid inlet 10 and the fluid outlet 12 may be in a closed state. Further, during the pressurizing dwell period, the valve unit 14 for the fluid inlet 10 may be in an opened state and a pump may continue pressurizing the fluid. After the pressurizing dwell period, at a pressurizing end time, the pressurized fluid is allowed to flow out of the pressure bag 8 by opening the valve unit 14 for the fluid outlet 12. In order to accelerate this depressurizing process, the fluid (gas or liquid) may be actively sucked out of the pressure bag 8. Hence, a time lag between two consecutive forming steps may be reduced.

In order to limit longitudinal stretch of the pressure bag 8 in the conveying direction C during the forming step, which might cause wrinkle formation of the semi-finished product 2, the pressure bag 8 may include structural reinforcements such as, e.g., woven cloth. In an embodiment, the pressure bag 8 comprises unidirectional reinforcements, oriented parallel to a longitudinal axis of the pressure bag 8.

Further, by using a pressure bag 8, a pressure elevation in a radius area of the forming surface may be reduced, which lowers the risk of occurrence of so-called radius thin out of the semi-finished material 2 at a convex curved portion of the forming surface (radius area).

In the forming step S4 described herein and by using the forming tool 6 described herein, no vacuum volume has to be hermetically sealed from the surrounding atmosphere. Thus, long structures of semi-finished products 2 (long final product forms) may be formed by forming adjacent parts of the semi-finished product 2 in consecutive forming steps of the same forming tool 6. In a vacuum forming tool (hot drape forming) of the prior art, for this, a hermetically sealed boundary has to be achieved between a membrane and the semi-finished product 2. Thus, the method, the forming tool and the forming apparatus described herein allow a faster and simplified forming of large semi-finished products 2, while less floor space footprint is required.

Figure 2B:
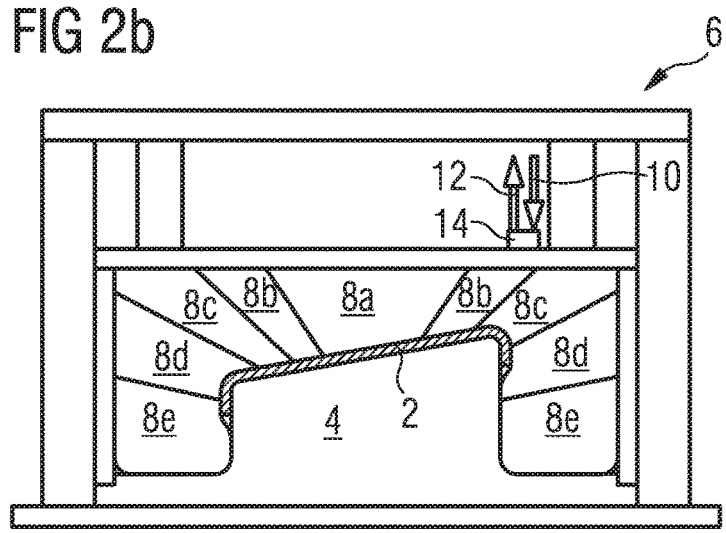
FIG. 2b shows a schematic front view of a forming tool for forming a semi-finished product comprising reinforcement fibers, as used, e.g., in the fourth step of the method shown in FIGS. 1a-c, the forming tool comprising a plurality of pressure bags.

FIG. 2b shows a schematic cross-sectional front view of another embodiment of a forming tool 6, which may be used, e.g., in step S4 of the method described above with reference to FIGS. 1a-c. The forming tool 6 of the embodiment shown in FIG. 2b comprises a plurality of pressure bags 8a, 8b, 8c, 8d, 8e. The general concept of the forming tool 6 shown in FIG. 2b is the same as that of the forming tool 6 shown in FIG. 2a and described above. Hence, the above description of the forming tool shown in FIG. 2a also applies to the forming tool 6 shown in FIG. 2b unless mentioned otherwise below. In particular, unless mentioned otherwise, the mode of operation of one of the plurality of pressure bags 8a-e may correspond to that of the pressure bag 8 shown in FIG. 2a.

Exemplarily, nine pressure bags 8a-e are shown in FIG. 2b. However, the forming tool 6 may also comprise more or fewer than nine pressure bags. The pressure bags 8a-e are arranged adjacent to each other in a direction perpendicular to the conveying direction C. However, additionally or alternatively, pressure bags may be provided that are arranged adjacent to each other in the conveying direction C. Each one of the pressure bags 8*a-e* comprises a membrane forming an outer contour of the respective pressure bag 8*a-e* and hermetically sealing an inside of the pressure bag 8*a-e* from an outside of the pressure bag 8*a-e*. In a pressurized state (e.g., during a dwell period), parts of membranes of adjacent pressure bags 8*a-e* contact each other. For example, in the example shown in FIG. 2*b*, a part of the membrane of pressure bag 8*a* may contact a part of the membrane of pressure bag 8*b* arranged left from pressure bag 8*a*. The pressure bags 8*a-e* may be provided as individual bags each having an own membrane. Alternatively, the plurality of pressure bags 8*a-e* or part of the plurality of pressure bags 8*a-e* may be formed integrally. A plurality of pressure bags 8*a-e* may form one large integrally formed bag having a volume divided by membranes forming the plurality of pressure bags 8*a-e*. In this case, adjacent pressure bags 8*a-e* may share the same membrane. For example, in the example shown in FIG. 2*b*, the pressure bags 8*a* and 8*b* may share the same part of a membrane.

Each one of the pressure bags 8*a-e* may be pressurized individually. A controller (not shown) may be provided for controlling pressurizing start times, pressurizing end times, and/or an amount of pressure of the individual pressure bags 8*a-e*. Although only one inlet 10, one outlet 12, and one valve unit 14 are shown in FIG. 2*b*, each one of the pressure bags 8*a-e* may be provided with an inlet 10, an outlet 12, and a valve unit 14. Further, the volumes of at least two of the pressure bags 8*a-e* may be connected to each other behind a common inlet 10, a common outlet 12, and a common valve unit 14, such that a pressurizing start time, a pressurizing end time and an amount of pressure is the same for these at least two pressure bags 8*a-e*. For example, in the example shown in FIG. 2*b*, the two pressure bags 8*b*, the two pressure bags 8*c*, the two pressure bags 8*d*, and the two pressure bags 8*d* may be connected to each other, respectively. In this case, pressure values of the pressure bag 8*a* and the pressure bags 8*b* may differ but pressure values of the two pressure bags 8*b* do not differ from each other.

When a plurality of pressure bags 8*a-e* are provided, as shown in FIG. 2*b*, pressurizing start times of these pressure bags 8*a-e* may be individually controlled by a controller. For example, after the semi-finished product 2 is placed in the forming tool 6, firstly, a central pressure bag 8*a* is pressurized. Thus, a portion of the semi-finished product 2 between the pressure bag 8*a* and the forming element 4 is pressed to a corresponding portion of the forming surface of the forming element 4 and thereby formed. The central pressure bag 8*a* corresponds to a pressure bag adjacent to a middle portion (central portion) of the semi-finished product 2 as seen in a cross section taken in a plane perpendicular to the conveying direction C. By pressurizing the central pressure bag 8*a*, excess matrix material of the semi-finished product 2 is pushed to side portions where the central pressure bag 8*a* does not contact the semi-finished product 2. Subsequently, a pressure bag 8*b* adjacent to the central pressure bag 8*a* is pressurized. For example, as shown in FIG. 2*b*, the two pressure bags 8*b* may be pressurized simultaneously. For example, as described above, the two pressure bags 8*b* may have volumes connected to each other. After that, subsequently, the pressure bags 8*c*, 8*d*, and 8*e* are pressurized in this order towards a side portion of the semi-finished product 2 as seen in the cross section taken in the plane perpendicular to the conveying direction C.

By applying this pressurizing order, excess matrix material may be pushed to side portions of the semi-finished product 2 and the formation of wrinkles may be suppressed. Thus, a flat (wrinkle-free) surface of the final product may be achieved having a high quality and stability.

Further, the pressures between the individual pressure bags 8*a-e* may vary. For example, a pressure applied to the semi-finished product 2 by the central pressure bag 8*a* may be higher than a pressure applied by the pressure bags 8*c* and 8*d* provided at convex shaped (radius) portions of the forming surface. Hence, the occurrence of radius thin out may be prevented.

In an embodiment, the pressure applied to the pressure bags 8*a-e* and/or the pressurizing start times of the pressure bags 8*a-e* are the same.

Figure 2C:
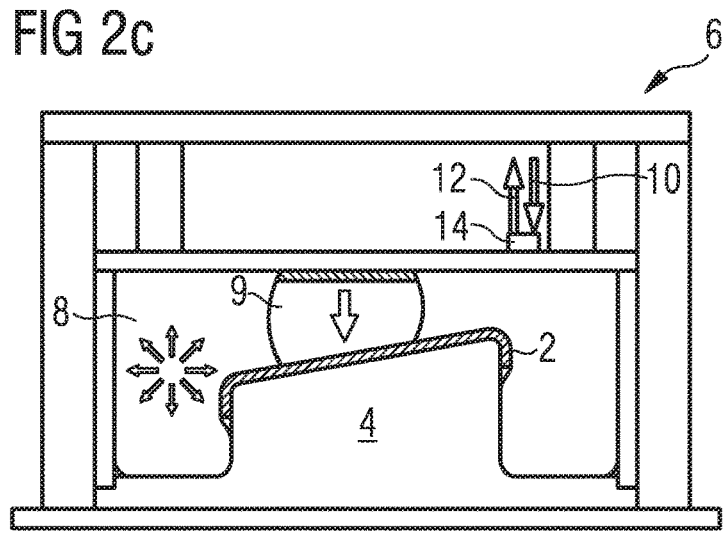
FIG. 2c shows a schematic front view of a forming tool for forming a semi-finished product comprising reinforcement fibers, as used, e.g., in the fourth step of the method shown in FIGS. 1a-c, the forming tool comprising at least one pressure bag and at least one other pressure distribution element.

FIG. 2*c* shows a schematic cross-sectional front view of another embodiment of a forming tool 6, which may be used, e.g., in step S4 of the method described above with reference to FIGS. 1*a-c*. The forming tool 6 of the embodiment shown in FIG. 2*c* comprises a pressure bag and a pressure distribution element 9 different from a pressure bag. The pressure distribution element 9 may be, e.g. an elastomer block configured to apply a pressure to the semi-finished product 2. An arbitrary number of pressure bags (e.g., a plurality of pressure bags as shown in FIG. 2*b* and as described above) may be provided. Further, an arbitrary number of pressure distribution elements 9 may be provided (e.g. one pressure distribution element 9 or a plurality of pressure distribution elements 9). The functions of the forming tool 6 of FIG. 2*c* (in particular of the pressure bag(s) 8, 8*a-e* and their control) are the same as those described with reference to FIGS. 2*a* and 2*b* and therefore do not have to be repeated.

The pressure distribution element 9 may be controlled in a similar manner as one of the plurality of pressure bags 8*a-e* shown in FIG. 2*b*. For example, the pressure distribution element 9 may be configured to apply a pressure to a certain section of the forming surface. Further, a pressure bag 8 or a plurality of pressure bags may be provided for applying a pressure to the remaining sections of the forming surface.

Figure 3A:
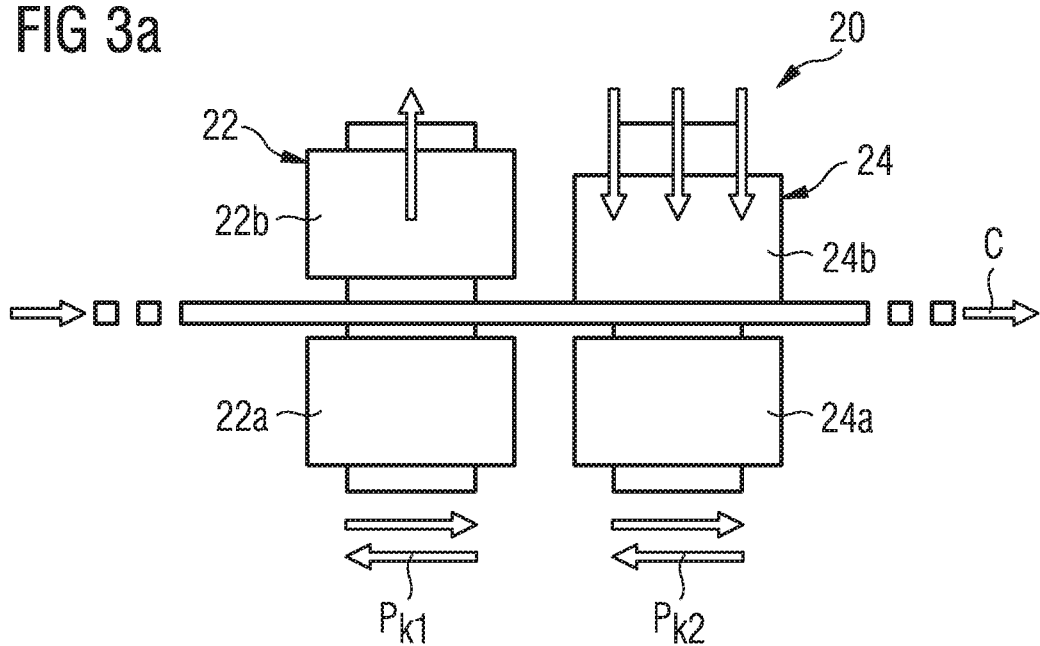
FIG. 3a shows a schematic side view of a conveying device for conveying the semi-finished product in a conveying direction, wherein the conveying device comprises at least two clamping apparatuses.
Figure 3B:
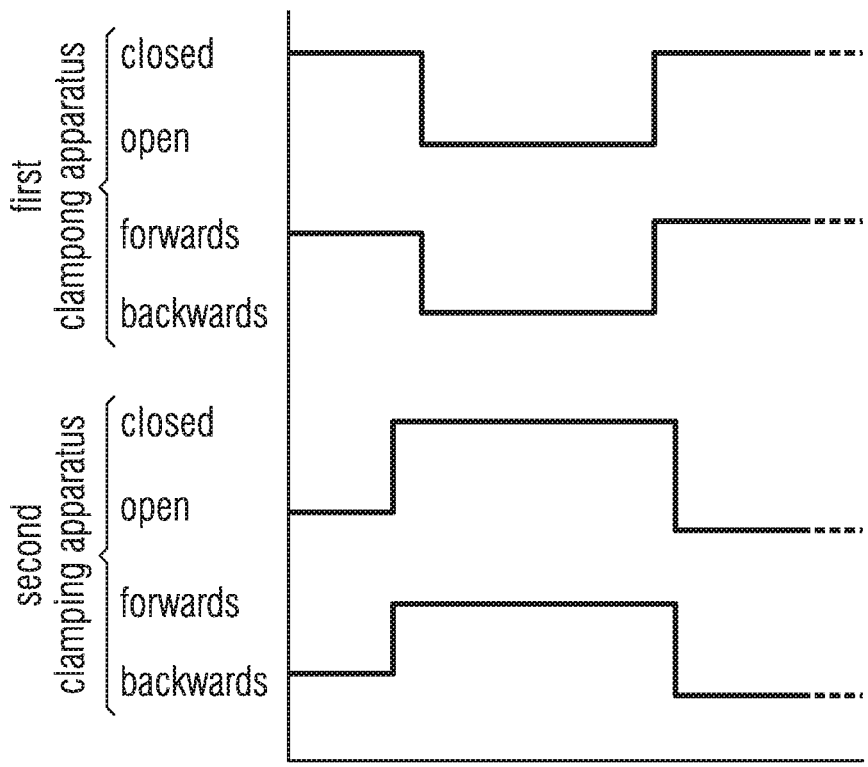

FIG. 3*a* shows an example for a conveying device 20 which may be used in the forming apparatus described herein. The semi-finished product 2 is conveyed through the forming apparatus by means of a conveying device 20. The conveying device 20 shown in detail in FIG. 3*a* comprises a first and a second clamping apparatus 22, 24, which are each adjustable between an open position, in which they release the semi-finished product 2, and a closed position, in which they clamp the semi-finished product 2 tightly between two clamping jaws 22*a*, 22*b*, 24*a*, 24*b*. The clamping apparatuses 22, 24 are moreover movable, as indicated by the arrows PK1, PK2 in FIG. 3*a*, in the conveying direction C of the semi-finished product 2 or counter to the conveying direction C of the semi-finished product 2 through the forming apparatus between a clamping position (closed state) and a release position (opened state).

Operation of the conveying device 20, like operation of the other components of the forming apparatus, is controlled by means of a central electronic control device. However, as an alternative to the central control device a plurality of separate control devices may be used. The control device controls the operation of the two clamping apparatuses 22, 24 in such a way that the first clamping apparatus 22 is situated in its open position and is moved counter to the conveying direction C of the semi-finished product 2 relative to the semi-finished product 2 from its release position into its clamping position when the second clamping apparatus 24 is situated in its closed position and is moved in the conveying direction C of the semi-finished product 2 jointly with the semi-finished product 2 from its clamping position into its release position.

Conversely, the first clamping apparatus 22 is situated in its closed position and is moved in the conveying direction C of the semi-finished product 2 jointly with the semi-finished product 2 from its clamping position into its release position, when the second clamping apparatus 24 is situated in its open position and is moved counter to the conveying direction C of the semi-finished product 2 relative to the semi-finished product 2 from its release position into its clamping position. This oppositely directed operation of the two clamping apparatuses 22, 24 is also illustrated in the schematic diagram in FIG. 3b.

As an alternative to the variant of a conveying device 20 shown in FIG. 3a, the conveying device may also comprise two opposing conveyor belts (not shown). The conveyor belts are movable in opposite directions and exert such a clamping force on a portion of the semi-finished product 2 disposed between the conveyor belts that the semi-finished product 2 is moved in its conveying direction C by means of the conveying movement of the conveyor belts. At least one of the conveyor belts is then preferably spring-mounted in order to compensate variations in the thickness of the semi-finished product 2 that is to be fed through the forming apparatus by means of the feed device.

Although various features of the invention have been described here with reference to specific embodiments of a forming tool, a forming apparatus, and a forming method, these features may be combined in any desired manner with one another, unless explicitly mentioned otherwise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A forming apparatus for forming a semi-finished product comprising reinforcement fibers, the forming apparatus comprising:
    a forming tool for forming a semi-finished product comprising reinforcement fibers and being conveyed to the forming tool in a continuous process;
    a forming element comprising a forming surface; and
    a conveying device for conveying the semi-finished product along a conveying direction, the forming tool comprising:
        at least one pressure bag configured to be pressurized during a forming step of the semi-finished product, during which forming step the semi-finished product is sandwiched between the forming surface of the forming element and the at least one pressurized pressure bag, such that the semi-finished product substantially takes on the shape of the forming surface, wherein a cross section of the forming element taken in a plane perpendicular to the conveying direction of the semi-finished product varies along the conveying direction; and
        at least one wrinkle reduction means comprising unidirectional structural reinforcements oriented parallel to a longitudinal axis of the at least one pressure bag configured to limit longitudinal stretch of the at least one pressure bag in the conveying direction wherein a structural configuration of the at least one pressurized bag limits a wrinkle formation in the semi-finished product,
        wherein the at least one pressure bag comprises a volume divided by membranes, wherein the unidirectional structural reinforcements comprise at least one of a thicker membrane portion and an additional material applied on at least one local portion of at least one of the membranes of the at least one pressurized bag pressure bag.

2. The forming apparatus according to claim 1, wherein the forming tool further comprises:
    a plurality of pressure bags configured to be pressurized during the forming step.

3. The forming apparatus according to claim 1, wherein the forming tool further comprises:
    at least one pressure distribution element different from a pressure bag.

4. The forming apparatus according to claim 1, wherein the forming tool further comprises:
    a controller configured to control at least one of an amount of pressure, a pressurizing start time, and a pressurizing end time of the at least one pressure bag.

5. The forming apparatus according to claim 1, wherein the forming tool further comprises:
    a fluid inlet for supplying the at least one pressure bag with a pressurized fluid;
    a fluid outlet for allowing the fluid to flow out of the at least one pressure bag; and
    a valve unit for controlling a fluid flow through the fluid inlet and the fluid outlet.

6. The forming apparatus according to claim 1, wherein the conveying device comprises at least two clamping apparatuses arranged consecutively in the conveying direction and configured to convey the semi-finished product or the forming element along the conveying direction.

7. The forming apparatus according to claim 1, further comprising:
    a preforming tool arranged in front of the forming tool in the conveying direction, wherein the preforming tool is configured to preform the semi-finished product.

8. The forming apparatus according to claim 1 further comprising a controller configured to pressurize the at least one pressurized bag in sequence wherein an excess matrix material of the semi-finished product is pushed to side portions of the semi-finished product.

* * * * *